United States Patent [19]

Richards et al.

[11] Patent Number: 5,331,490
[45] Date of Patent: Jul. 19, 1994

[54] TAPE HEAD FINE POSITIONING SYSTEM FOR A TAPE BACKUP DRIVE

[75] Inventors: Alan J. Richards, Loveland; William A. Godette, Longmont; Helmuth O. Kroog, Berthoud; Kevin L. Miller, Loveland, all of Colo.

[73] Assignee: Hewlett-Packard Company, Palo Alto, Calif.

[21] Appl. No.: 606,887

[22] Filed: Oct. 31, 1990

[51] Int. Cl.⁵ ............................................. G11B 5/58
[52] U.S. Cl. ................................................. 360/109
[58] Field of Search ............ 360/109, 104, 106, 77.12, 360/77.13, 78.02

[56] References Cited

U.S. PATENT DOCUMENTS

| | | | |
|---|---|---|---|
| 4,200,894 | 4/1980 | Kaseta et al. | 360/106 |
| 4,383,283 | 5/1983 | Machut | 360/106 |
| 4,630,145 | 12/1986 | Thompson et al. | 360/77 |
| 4,675,761 | 6/1987 | Ashbee et al. | 360/78 |
| 4,707,753 | 11/1987 | Friehauf et al. | 360/105 |
| 4,747,004 | 5/1988 | Kukreja et al. | 360/106 |
| 4,833,558 | 5/1989 | Baheri | 360/106 |
| 4,858,047 | 8/1989 | Cannon et al. | 360/106 |
| 4,943,877 | 7/1990 | Cannon et al. | 360/106 |

Primary Examiner—Stuart S. Levy
Assistant Examiner—Paul J. Ditmyer

[57] ABSTRACT

The present invention provides a back-up tape drive having a precision molded chassis with a fine positioning system for a tape head. This system includes a follower nut threadingly mounted on a lead screw that is bi-directionally rotated by a stepper motor. A lever arm engages the follower nut in a manner such that torsional moments between the forces of the follower nut and lever arm are minimized. The other end of the lever arm engages a tape head mounting unit. The lever arm pivotally engages the chassis at a predetermined midpoint of the lever arm such that a mechanical advantage is derived. The positioning system is designed so the forces acting on the tape head mounting unit are aligned to minimize the torsional forces acting on the tape head mounting unit. The tape head mounting unit further includes reference features that reduce the need for azimuth and zenith adjustment.

82 Claims, 7 Drawing Sheets

TAPE HEAD FINE POSITIONING SYSTEM FOR A TAPE BACKUP DRIVE

BACKGROUND OF THE INVENTION

1. Field of the Invention

This invention relates to a head positioning apparatus for tape recording heads and, more particularly, to a fine pitch lead screw and lever arm system that positions a tape head in a tape cartridge back-up drive for personal computer data storage systems.

2. Statement of the Problem

In tape cartridge back-up systems for personal computers, parallel tracks of data are recorded on a tape media in a data cartridge. A recording head with a single read/write gap must be positioned on the tracks such that the head gap centerline is within a prescribed dimensional tolerance of the recorded track centerline. This requires precision in the alignment and positioning of the tape head and in the tracking of the tape head.

The problem of such track positioning has been addressed in other magnetic media devices that require a head to be positioned or repositioned to different tracks located on the media. For example, magnetic disk storage systems use stepper motors with lead screws that directly drive the head or alternatively use a band wrapped around a post in conjunction with a pivoting arm to position a head over the disk shaped media. Lever arms have been used to position the recording head.

In U.S. Pat. No. 4,630,145 for a "Fine Positioning Apparatus for Floppy Disk Drive", issued to Thompson, two stepper motors are used to provide both coarse and fine positioning to a read/write head. The first stepper motor engages a first lead screw that directly moves the head carriage to provide a coarse adjustment. The second stepper motor is connected to a second lead screw which causes the first lead screw and the head carriage to move in fine adjustment. Similar devices are disclosed in U.S. Pat. No. 4,747,004 and in U.S. Pat. No. 4,609,958.

In previous tape drives using tape cartridges, the head is positioned by directly driving the head with a follower nut positioned on a lead screw. This method, although simple and straightforward, limits the resolution of the head positioning as a function of the pitch of the lead screw. Hence, a stepper motor is required to have a very fine step increment for adequate positioning accuracy. In one commercial approach, a spiral surface cam, mounted to a stepper motor, uses a lever arm actuated by the cam surface to position the recording head. While this approach uses the mechanical advantage of the lever arm, the cam itself is only able to rotate one full revolution. Hence, a very precise cam with a fine step increment on the stepper motor is required to obtain adequate accuracy in the positioning of the tape head.

A related patent, U.S. Pat. No. 4,858,047, assigned to the present assignee, discloses a fine positioning system for a back-up tape drive using a lead screw and lever arm approach. This device uses a cantilevered lever arm connected to a head mounting unit which is slidable on a single post. The lever arm utilizes the mechanical advantage of a predetermined ratio to accurately position the tape head without requiring an expensive stepper motor or multiple stepper motors. However, the torsional moments of the lever arm and head mounting unit create tracking errors in the operation of the device. Also, azimuth adjustment is still needed to accurately align the device.

There still exists a need for a tape head positioning system in a back-up tape drive which will reduce the torsional moments on the lever arm and the tape head mounting unit in the positioning system and eliminate the need for azimuth adjustment. The desired system would maximize precision positioning of the tape head while minimizing the expense of doing so.

3. Solution to the Problem

The present invention provides a solution to the problem by obtaining improved accurate positioning of the head through use of a follower nut mounted on a fine pitch lead screw with a lever arm mounted on the follower nut. The lever arm is mounted on the follower nut such that it eliminates cantilevered loads on the follower nut and substantially reduces the wobble effects created by lead screw run out. This mounting provides axial loading of the lever arm on the follower nut.

The present invention further provides a tape head mounting unit designed to reduce the torsional moments from movement of the tape head mounting unit.

The present invention also provides a positioning system that does not require azimuth adjustment.

SUMMARY OF THE INVENTION

The present invention provides a back up tape drive having a precision molded chassis with a fine positioning system for a tape head. This system includes a stepper motor that bi-directionally rotates a molded plastic lead screw. A follower nut is threadingly mounted on the lead screw. A lever arm engages the follower nut in a substantially horizontal plane and constrains the follower nut from rotating. The follower nut and lever arm are thus translated vertically as the lead screw rotates. The axis of rotation of the lead screw is perpendicular to the longitudinal axis of the lever arm as well as perpendicular to the horizontal plane containing the engagement between the lever arm and the follower nut such that the force distribution is balanced between the follower nut and lever arm.

The other end of the lever arm engages a tape head mounting unit which is mounted to slide vertically on the chassis. The lever arm pivotally engages the chassis at a predetermined midpoint of the lever arm so that a mechanical advantage is derived from the ratio of the length of the first end of the lever arm to the pivot point and the length of the second end of the lever arm to the pivot point. This mechanical advantage allows a less expensive stepper motor to be used while maintaining a high degree of precision in the positioning of the tape head.

The tape head mounting unit is upwardly biased against the force of the second end of the lever arm to assure positive engagement between the lever arm and the tape head mounting unit. The tape head mounting unit includes biasing elements that assist in the precise alignment of the tape head mounting unit in the azimuth and zenith planes. The positioning system is designed such that the forces acting on the tape head mounting unit are in the same vertical plane thereby minimizing the torsional forces acting on the tape head mounting unit. The tape head mounting unit further includes reference surfaces that align the tape head during the mounting process to reduce the necessity for azimuth adjustment. An optional self-fixturing feature is provided to eliminate the need for external clamping when mounting the tape head. These and other features increase the accuracy of positioning the tape head unit in the device.

DESCRIPTION OF THE PREFERRED EMBODIMENT

Figure 1:
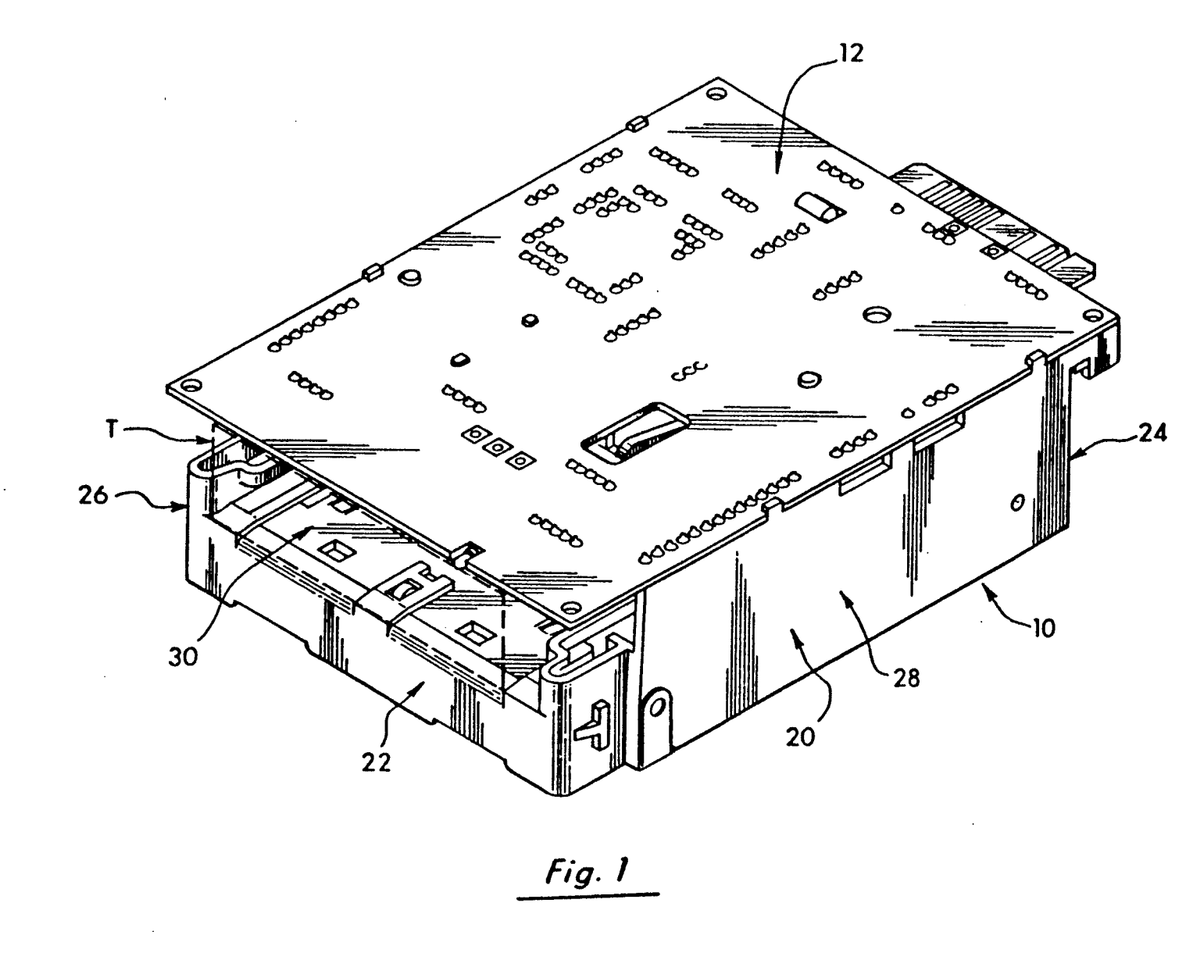
FIG. 1 is a perspective view of the tape back-up drive of the present invention.
Figure 2:
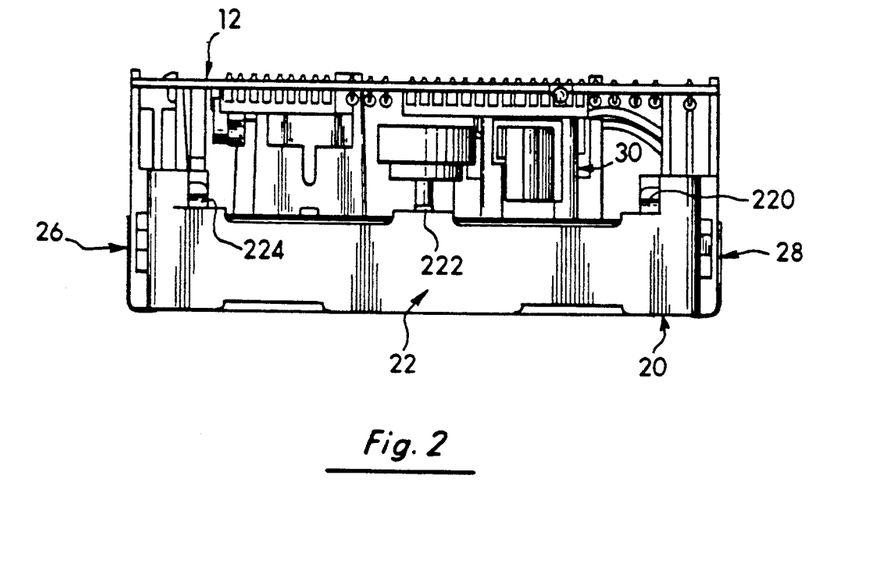
FIG. 2 is a front view of the back-up tape drive.
Figure 3:
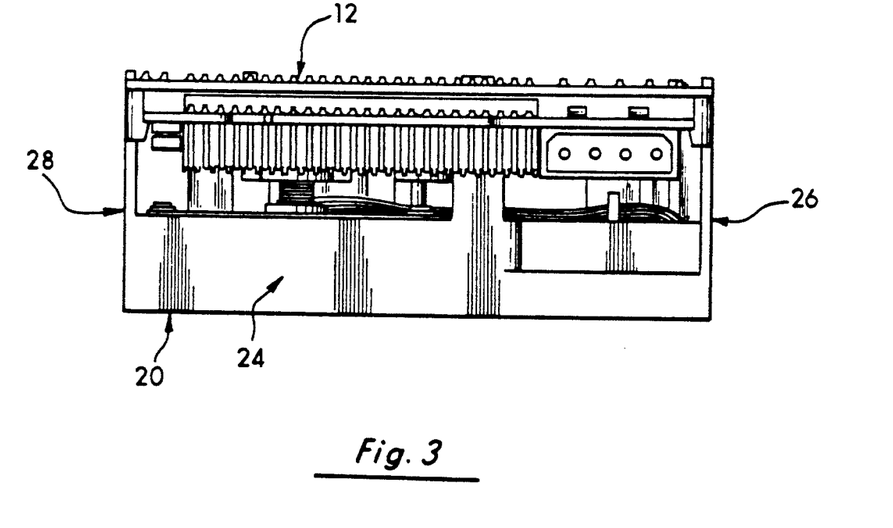
FIG. 3 is a rear view of the back-up tape drive.

The back-up tape drive 10 of the present invention is illustrated in FIGS. 1-3. The drive 10 includes a circuit board 12 that does not form a part of the present invention, and chassis 20. The chassis 20, as will be further discussed below, has a rectangular shaped box-like structure having a front end 22, a rear end 24, and side walls 26, 28. The drive 10 is designed to be installed in most personal computers, typically in the space allotted for a floppy disk drive. A standard back-up tape T (shown by dotted lines) is inserted into the space 30 in the front end 22 of the tape drive 10 and the system is then activated to read/write data from or to the tape.

Figure 4:
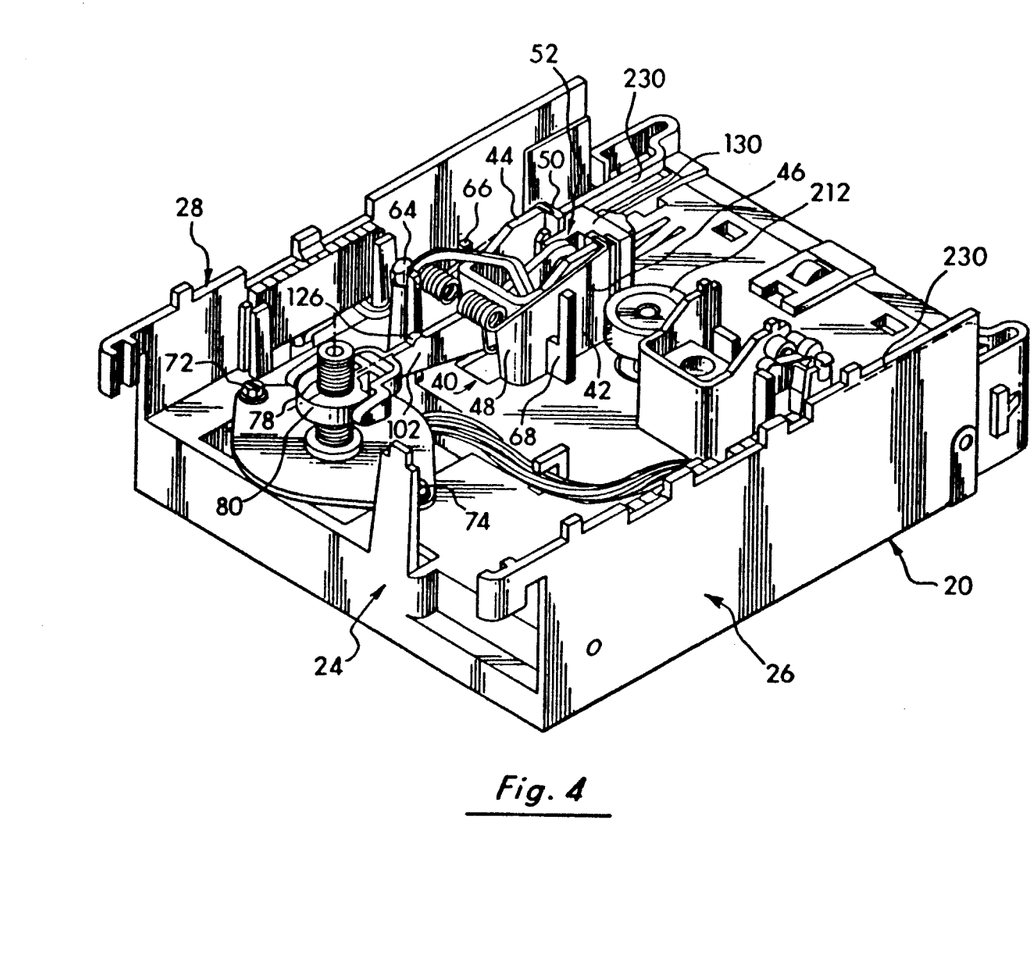
FIG. 4 is a perspective view of the back-up tape drive with the circuit board removed to show details of the positioning system.

The particular features of the present invention are primarily directed to the fine positioning system 40, as shown in FIG. 4, of the back-up tape drive 10. The following description of the preferred embodiment is for illustrative purposes only and is not meant to limit the present invention to this description. Other embodiments and variations within the scope and spirit of the inventive concept are encompassed by the claimed invention.

Figure 5:
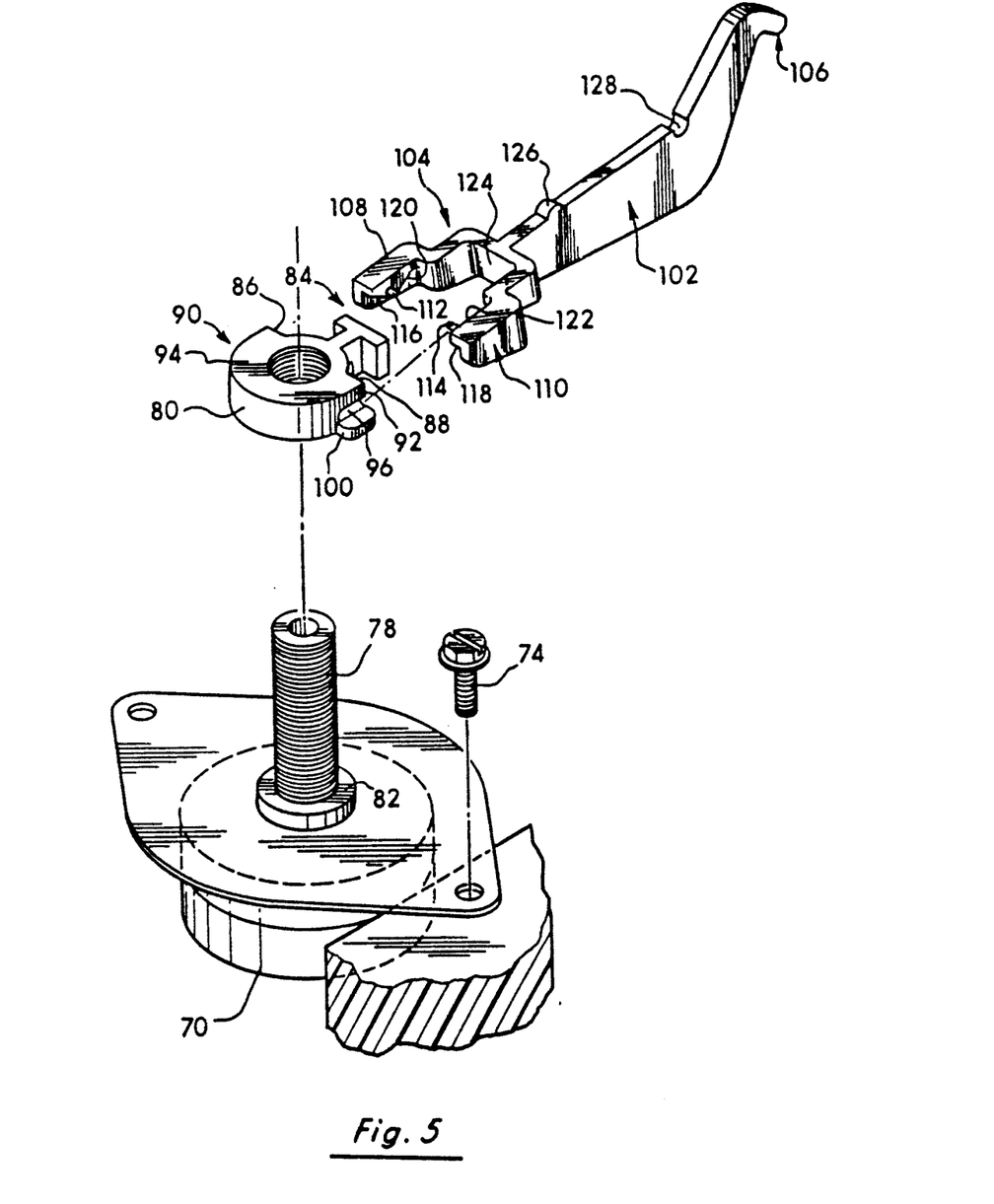
FIG. 5 is an exploded view of the stepper motor, lead screw, follower nut and lever arm of the present invention.

This system includes a precisely molded chassis 20 having a stepper motor 70, illustrated in FIG. 5, that bi-directionally rotates a molded plastic lead screw 78. A follower nut 80 is threadingly mounted on the lead screw 78. A lever arm 102 engages the follower nut 80 in a horizontal plane. The center of rotation of the lead screw 78 is perpendicular to the longitudinal axis of the lever arm 102 as well as substantially perpendicular to the horizontal plane containing the engagement between the lever arm and follower nut. Thus, the force distribution is balanced between the follower nut 80 and lever arm 102. The lever arm 102 constrains the follower nut 80 from rotation so that follower nut 80 and lever arm 102 are driven together vertically as the lead screw 78 rotates.

The other end 106 of the lever arm 102 engages a tape head mounting unit 130 into which a tape head is mounted. The lever arm 102 pivotally engages the chassis 20 at a predetermined midpoint 128 of the lever arm so that a mechanical advantage is derived from the ratio of the length of the first end of the lever arm to the pivot point 128 and the length of the second end 106 of the lever arm to the pivot point 128. This mechanical advantage allows a less expensive stepper motor to be used while maintaining a high degree of precision when positioning the tape head.

Figure 10:
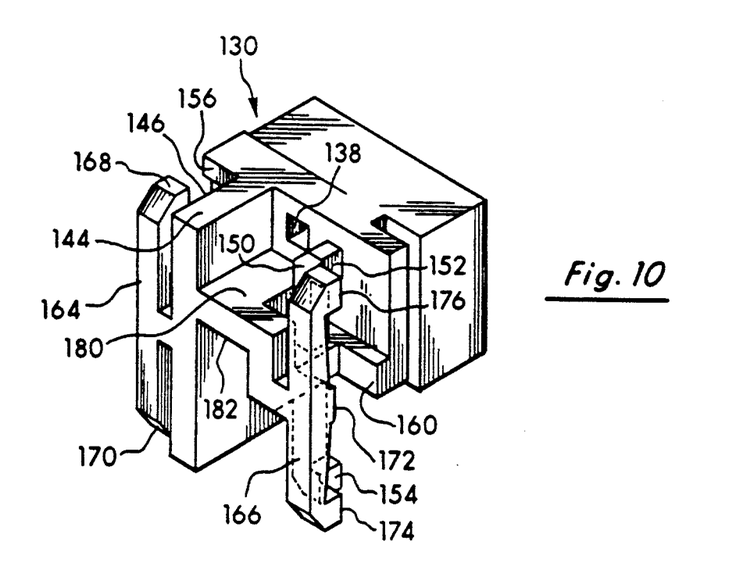
FIG. 10 is a rear perspective view of the head mounting unit.

The configuration of the tape head mounting unit 130 is shown in FIG. 10; it is upwardly biased against the force of the second end 106 of the lever arm 102 to assure positive engagement. The tape head mounting unit 130 includes biasing elements 150, 164, 166 that assist in precisely aligning the tape head mounting unit 130 in the azimuth and zenith planes. The positioning system is designed such that the forces acting on the tape head mounting unit are contained in the same vertical plane thereby minimizing the torsional forces acting on the tape head mounting unit. The tape head mounting unit further includes reference surfaces that align the tape head during mounting to reduce the necessity of azimuth adjustment. Also, an optional self-fixturing resilient side wall is provided on the tape head mounting unit to clamp the tape head during the mounting process to eliminate the need for external clamping devices. These and other features increase the accuracy of the positioning of the tape head unit in the device. These features will be discussed in greater detail below.

THE CHASSIS

The chassis 20 of the back-up tape drive is formed of a fiber-reinforced polycarbonate material having major characteristics including dimensional stability under varied environmental extremes, excellent wear resistance and torsional rigidity. It is to be expressly understood that the present invention is not meant to be limited to this particular material. Other materials may be substituted having these or other characteristics without deviating from the inventive scope of the claimed invention. The chassis is formed by a highly precise method of molding. Through this process of precision molding, a dimensional tolerance of plus or minus 0.0005 (five/ten thousandths) inches is maintained throughout critical areas of the structure. This enables the particular features of the positioning system to be mounted without necessitating further azimuth adjustment. Further, the remaining elements of the positioning system and tape drive unit are all designed to be snapped into place on the chassis 20 without requiring additional alignment or separate fasteners. The only exception is the stepper motor 70 which use two self-tapping plastoid screws 72, 74 to fasten the motor to the chassis 20. The screws are counter-sunk to precisely align the stepper motor in the chassis. The assembly process is thus greatly simplified and sped up by eliminating the need for azimuth adjustment and by using snap together assembly.

Figure 6:
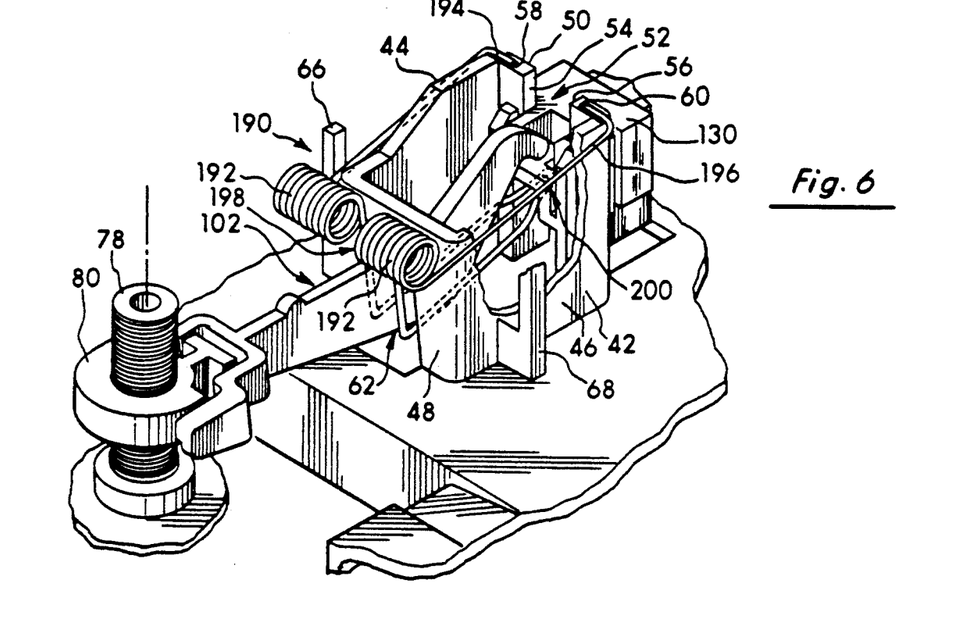
FIG. 6 is a cut-away view of the follower nut, lever arm and head mounting unit of the present invention.

As illustrated in FIGS. 4 and 6, the chassis 20 includes a positioning system structure 42 formed near the front end 22 of the chassis. This positioning structure 42 includes a substantially rectangular shaped, open box design having two opposing side walls 44, 46, a rear wall 48 and a front wall 50. The front wall has a slot 52 formed in its center. The slot 52 includes two side walls 54, 56. The slot side walls 54, 56 are formed with a small step located about the midsection of each side wall to alleviate problems with maintaining the dimensional tolerances over the entire height of the side walls 54, 56. Grooves 58, 60 are formed in the top of the front wall.

The slot side walls 54, 56 are molded to be precisely aligned with reference to the side walls of the cartridge entry opening. This provides a precise alignment between the cartridge tape and the tape head as will be further discussed below.

A center notch 62 is formed in the central portion of the rear wall 48. The notch 62 extends from the base of the rear wall 48 partially up the rear wall. The purpose of the slot 52, grooves 58, 60 and the notch 62 will be discussed below.

An upwardly extending reference post 64 is formed on the chassis 20 to precisely align the circuit board 12 in position when attached to the chassis 20 of the tape drive 10.

The chassis may be provided with optional side rails (not shown) depending upon the computer in which it is to be installed. These optional side rails enable the back-up tape drive to be installed in a variety of types of personal computers.

Figure 11:
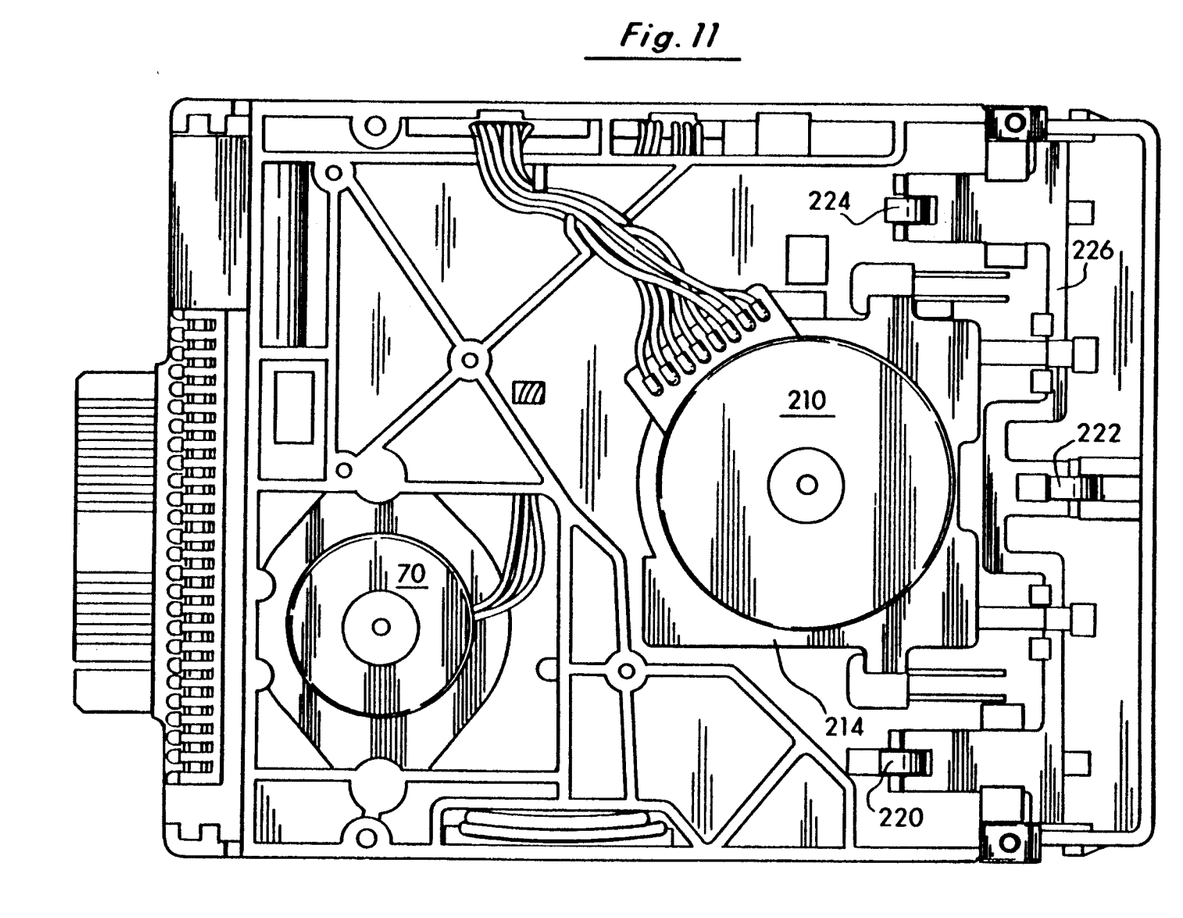
FIG. 11 is a bottom view of the back-up tape drive of the present invention.

The chassis 20 further includes a cavity formed in the bottom of the chassis 20, as shown in FIG. 11, to receive the capstan drive motor 210 by simply snapping the motor 210 into place without requiring separate fasteners or necessitating alignment. The chassis 20 also includes another cavity that receives the stepper motor 70 to align the drive shaft of the stepper motor 70 into parallel alignment with the drive shaft of the drive motor 210.

Alignment tabs and slots are formed along the tops of the rear wall and side walls of the chassis to align and secure the circuit board 12 on the chassis. Connectors on the circuit board 12 connect with connectors premounted on the chassis so that the circuit board 12 is assembled to the chassis 20 quickly and easily.

The chassis 20 includes other features formed thereon that increase the ease of assembly and the accuracy of the operation of device. These features are not detailed at this time.

The chassis can be formed of other materials and by other processes that accomplish the above functions and tolerances without deviating from the claimed invention.

STEPPER MOTOR AND LEAD SCREW

As shown in FIG. 5, the stepper motor 70 is mounted to the bottom of the chassis 20 by the self-tapping plastoid screws 72, 74. The motor 70 extends perpendicularly through the base of the chassis 20. The stepper motor 70 bi-directionally rotates a drive shaft (not shown) that extends perpendicularly up through the base of the chassis.

A lead screw 78 is pressed onto the drive shaft to be bi-directionally rotated by the stepper motor. Lead screw 78 is formed from a material such as nylon by high precision molding to a dimensional tolerance of ±0.0005 (five/ten thousandths) inches over the entire length of the lead screw, which is typically 0.750 (seven hundred fifty/thousandths) inch. This provides greater lubricity, wear resistance and quietness as well as reducing the expense of using a metallic lead screw. The lead screw 78 typically uses a finely threaded pitch, for instance, 56 threads per inch. It is to be expressly understood that other materials and thread pitches could be utilized depending on the design considerations.

FOLLOWER NUT

As illustrated in FIGS. 4–6, follower nut 80 is threadingly mounted on the lead screw 78. The follower nut 80 is formed of a high density plastic having superior lubricity characteristics and stability under a wide range of operating environments. The follower nut 80 has a substantially semi-cylindrical shape with a T-shaped extension 84 on its forward end. The semi-cylindrical portion terminates near the forward end of the follower nut at flat surfaces 86, 88 that extend perpendicularly inward from the semi-cylindrical portion to a smaller cylindrical portion. The T-shaped extension 84 extends from the center of the smaller cylindrical portion along an axis orthogonal to the center of rotation of the lead screw. The T-shaped extension adds further restraint to the system.

Horizontal slots 94, 96 are formed on the opposing side surfaces 90, 92. Each of the slots 94, 96 includes an end open at the flat surfaces 86, 88 of the follower nut and a closed end near the midsection of the follower nut. Load bearing surfaces 98, 100 extend outward from the lower edge of the slots 94, 96, respectively. Differing shapes and materials could be utilized to accomplish the functions as discussed above without deviating from the scope and spirit of the claimed invention.

LEVER ARM

The lever arm 102 is formed of a high density carbon filled material that provides a high degree of stiffness to the lever arm 102 thereby improving the load characteristics of the lever arm. The lever arm 102 is formed in an elongated shape having a substantially U-shaped yoke 104 on one end and an elevated contact arm 106 on the opposing end. The yoke 104 includes guide pins 112, 114 formed respectively on each arm 108, 110 of the yoke. These pins 112, 114 are inwardly spaced from the ends of the arms of the yoke and extend radially inward therefrom. The pins are substantially the same diameter as the width of the slots 94, 96 of the follower nut 80 and extend perpendicularly radially inward from the arms 108, 110 substantially the same distance as the depth of the slots 94, 96. The pins 112, 114 are inserted into the open end of the slots 94, 96 to guide the lever arm 102 into engagement with the follower nut 80. When fully inserted into the slots 94, 96 on the follower nut, the pins 112, 114 lie approximately in a vertical plane that includes the center of rotation of the lead screw 78. This vertical plane further lies perpendicular to the longitudinal axis of the lever arm.

The lever arm 102 further includes first surfaces 116, 118 which extend longitudinally inward from the outer end of each of the yoke arms 108, 110 and down at a first predetermined angle to the pins 112, 114. Second surfaces 120, 122 extend upwardly at a second predetermined angle from the lower end of the first surfaces 116, 118 and longitudinally inward. These surfaces, 116, 118, 120, 122 interact with the outwardly extending load bearing surfaces 98, 100 of the follower nut to balance the loading force distribution between the lever arm and follower nut in a substantially horizontal plane while allowing limited pivoting movement of the lever arm relative to the follower nut.

The loading forces acting on the lever arm and follower nut are aligned in a substantially horizontal plane extending perpendicular to the axis of rotation of the lead screw as well as including the longitudinal axis of the lever arm. The loading forces are also substantially aligned in a vertical plane that includes the axis of rotation of the lead screw. This reduces the moment arm of the forces acting on the lever arm 102. In addition, it balances the load distribution on the lever arm and follower nut to eliminate cantilevered loads on the follower nut and to substantially reduce the wobble effects created by the lead screw run out by providing an axial loading of the lever arm on the follower nut.

The yoke arms 108, 110 form L-shaped bends directed radially inward to a smaller U-shaped portion 124 that has an inner diameter of approximately the same width and length as the T-shaped extension 84 of the follower nut 80. This design adds further restraint to the system thereby reducing the instability of the positioning system.

Limit stop 126 is formed on the upper surface of the lever arm 102 and is spaced from the bracket 104. The operation of the limit stop 126 will be discussed below.

The lever arm includes a pivot point 128 formed a first predetermined distance from the axis of the pins 112, 114 and a second predetermined distance from the contact end 106. The lever arm 102 is insertable through the center notch 62 of the rear wall 48. The pivot point 128 of the lever arm pivotally engages the upper surface of the notch 62. The ratio of the predetermined distances forms the mechanical advantage of the system. The ratio is normally 2:1. This mechanical advantage allows the steps of the stepper motor 70 to be coarser and still retain the precision required for positioning the tape head. A coarser stepper motor may be several times less costly in price than a fine step stepper motor.

The lever arm extends upwardly from the pivot point 128, at an acute angle to the longitudinal axis of the lever arm. The engagement arm 106 angles slightly downward from the upper portion of the lever arm to ensure positive engagement of the lever arm to the tape head mounting unit 130.

The claimed invention is not meant to be limited to the shape and material choice as discussed above, but encompasses other configurations, variations and alterations within the scope and spirit of the inventive concept.

TAPE HEAD MOUNTING UNIT

Figure 8:
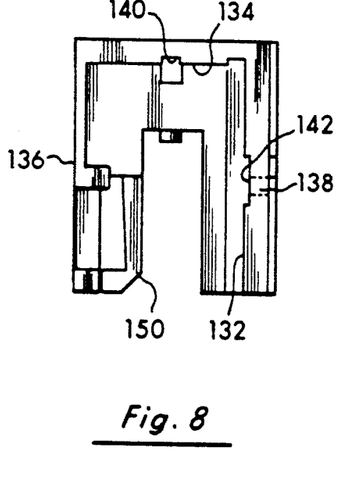
FIG. 8 is a front view of the head mounting unit.

The tape head mounting unit 130 is formed of a polyethersulfone resin by precision molding techniques. The head mounting unit includes reference surfaces that accurately align a tape head in the head mounting unit when mounting the tape head into the unit. These reference surfaces as illustrated in FIG. 8, include a precisely formed side wall 132 extending the full height of the head mounting unit, and a precisely formed upper surface 134. The tape head (not shown) is inserted into the tape head mounting unit 130 to abut against the alignment surfaces 132 and 134. Wick holes 136 and 138 for inserting glue are formed in the upper rear wall and mid-section of the side wall 132. Slight indentations 140, 142 are formed in the side wall 132 and the upper surface 134 for the glue to spread and adhesively bond the tape head in the tape head mounting unit 130 when the tape head is being mounted in the unit. The tape head is thus precisely positioned to be clamped and glued without necessitating extensive adjustment of the system due to inaccuracies of the mounting of the tape head.

Optionally, these surfaces may be used with a resilient side wall 136 that extends partially down the height of the tape head mounting unit 130. This side wall would eliminate the need for externally clamping the tape head in the tape head mounting unit when gluing the tape head in place. The side wall 136 biases the tape head against these surfaces to precisely align and clamp the tape head in the unit 130. These optional self-fixturing features eliminate the need for external clamping devices that require later azimuth adjustment of the tape head mounting unit due to misalignments that occur during the clamping process.

Figure 7:
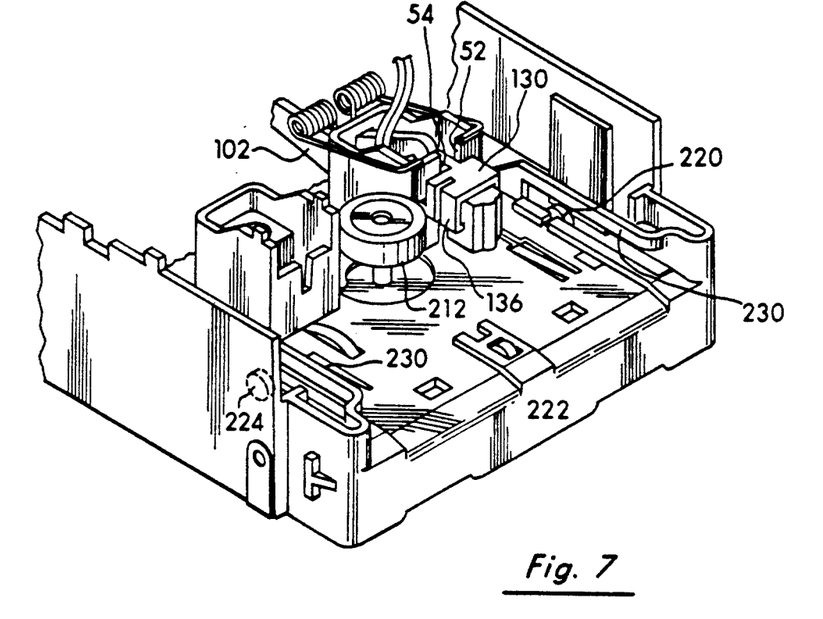
FIG. 7 is a partial view of the front of the back-up tape device showing the head mounting unit.
Figure 9:
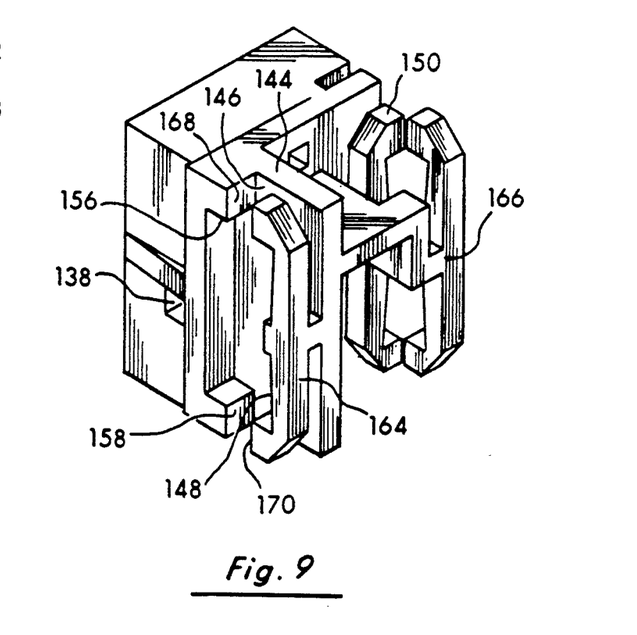
FIG. 9 is a perspective view of the head mounting unit of the present invention.

The tape head mounting unit 130 is inserted in slot 52 in the front wall 50 of the positioning system mounting structure 42 of the chassis 20 as shown in FIGS. 6 and 7. Upper engagement surface 146 is formed on the upper portion of the side surface of the rear portion 144 of the head mounting unit 130 while the lower engagement surface 148 is formed on the lower portion of the side surface 144 as illustrated in FIG. 9. The engagement surfaces 146, 148 contact the side wall 54 of the slot 52 as the head mounting unit vertically slides in the chassis. Resilient spring arm 150 is biased against the opposing side wall 56 of the slot 52 to precisely align the tape head mounting unit in the azimuth plane. As shown in FIG. 10, the spring arm 150 is formed with an upper contact surface 152 and a lower contact surface 154 that actually engage the side wall 56. Since the engagement surfaces 146, 148 and the contact surfaces 152, 154 are the only surfaces that engage the side walls 54, 56, this enables the side walls to be formed with a small step at the mid portion of the side walls to alleviate the need for forming the entire height of the side walls within the designated tolerances. The use of the arrangement of the two side walls provides alignment of the tape head with the tape cartridge since the side walls 54, 56 are aligned with reference surfaces 230 which guide and align the tape cartridge. The two side walls also provide more balanced loading and eliminate extraneous moments in the movement of the tape head mounting unit.

The head mounting unit 130 engages the front surface of the front wall 50 by an upper contact surface 156 and a lower contact surface 158 formed on the rear portion 144 as shown in FIG. 9. It also contacts a mid portion surface 160 formed on the rear portion 144 of the head mounting unit 130 as shown in FIG. 10. Resilient spring arms 164, 166 formed on the rear of the head mounting unit 130 are biased against the rear surface of the front wall 50 to align the head mounting unit in the zenith plane. The rear resilient arm 164 is formed with an upper contact surface 168 and a lower contact surface 170 that bias the upper contact surface 156 and lower contact surface 158 against the front wall 50. The rear resilient arm 166 has a mid portion contact surface 172, a lower contact surface 174 and an upper contact surface 176 that serve to bias the mid portion surface 160 against the front wall.

The resilient spring arms bias the precision molded contact surfaces of the tape head mounting unit into proper azimuth and zenith alignment so that further adjustment is not necessary. This increases the precision of the position system as well as the reliability of the system. The head mounting unit is also able to resiliently give to prevent any binding of the system.

An upper engagement surface 180 is formed on the rear portion of the tape head mounting unit 130. The system is designed such that the contact surface of the engagement arm 106 of the lever arm 102 engages the tape head mounting unit 130 on the engagement surface 180 to drive the head mounting unit 130 vertically downward. The engagement surface 180 is precisely positioned such that the contact surface of the engagement arm 106 is aligned in the same vertical plane as the contact surfaces 146, 148, 152, 154 of the head mounting unit. Engagement surface 180 is also extremely flat such that arm 106 can stroke the surface without interacting with any disparities that would cause a positional error of the tape head.

A lower engagement surface 182 is formed on the rear portion of the tape head mounting unit 130 directly below the upper engagement surface 182. The details of this surface will be further detailed below.

The claimed invention is not meant to be limited by this embodiment but encompasses other modifications and alterations as well which accomplish the functions of the tape head mounting unit as previously described.

TORSIONAL SPRING

A double coil torsional spring 190 is mounted on the chassis to provide an upward biasing of the head mounting unit 130 as shown in FIG. 6. The spring 190 includes a double coil 192 that equalizes the forces on the head mounting unit. The ends 194, 196 of the spring 190 are formed at right angles such that they lie in the grooves 58, 60 of the front wall 50 and are aligned in the vertical plane with the contact surfaces of the tape head mounting unit and the engagement surfaces. The spring arms extend back beyond the rear wall 48 to the double coil 192. The spring arms are constrained from lateral movement by upright arms 66, 68 formed on the chassis 20. The central portion 198 of the spring between the double coils forms a center arm 200 that extends through the center notch 62 of the rear wall 48. The center arm 200 contacts a lower engagement surface 182 formed on the rear portion of the head mounting unit 130. The lower engagement surface is precisely positioned such that the center arm 200 of the spring lies directly opposite of the contact surface of the engagement arm 106 of the lever arm and in the same vertical plane as the contact surfaces of the head mounting unit 130. The spring thus provides an upward biasing of the head mounting unit against the force of the lever arm to insure a positive tracking of the tape head. It is to be expressly understood that other types of biasing elements could be utilized without deviating from the inventive scope of the claimed invention.

DRIVE MOTOR MOUNTING

The drive motor 210 is mounted on the same chassis 20 as the stepper motor 70 and extends through the chassis as shown in FIGS. 7 and 11 to drive the capstan 212. The drive motor 210 is snapped into position on the chassis 20 from the bottom of the chassis. The drive motor 210 is provided with an electromagnetic shield 214 that reduces electrical noise and magnetic disturbances.

TAPE CARTRIDGE ALIGNMENT MECHANISM

Tape cartridges that are inserted into the back-up tape drive are aligned in position by the three cylindrical wheels 220, 222, 224 illustrated in FIGS. 2, 7 and 11. These wheels are formed from electroless nickel-plated brass to provide long lasting wear and quietness of operation. The wheels 220, 222, 224 are resiliently biased by a stamped steel plate 226 illustrated in FIG. 11. The plate is formed from spring steel by a stamping process. The plate 226 is snapped into place on the bottom of the chassis 20 necessitating separate fasteners, such that it uniformly and resiliently biases the wheels upwardly. The inserted tape cartridge is guided by the upward biased, rotatable wheels and by the precision molded reference surfaces 230 into proper alignment in the back-up tape drive 10. This allows the tape head to then be accurately and precisely aligned relative to the tracks on the tape cartridge to read or write the tape.

OPERATION OF THE FINE POSITIONING SYSTEM

A back-up tape cartridge T is inserted into the tape entry opening 30 of the back-up tape drive. The bushings 220, 222, 224 align the cartridge into position such that the tape drive motor 210 can engage the tape and the tape head can read/write data from or to the tape. Once the tape cartridge is in position, the system is activated and the positioning system moves the tape head in position to track the tape.

The stepper motor 70 bi-directionally rotates the lead screw 78 to vertically move the follower nut 80. The follower nut 80 moves the first end of the lever arm vertically while allowing a limited pivoting movement of the lever arm relative to the follower nut. As the follower nut nears the top end of the lead screw, the limit stop 126 formed on the lever arm contacts a switch (not shown) on the underside of the circuit board 12 to stop the stepper motor from further rotating the lead screw thereby preventing damage to the system.

The lever arm 102 pivots against the chassis at the notch 62 to move the engagement arm 106 in the opposite direction of travel of the follower nut. The engagement arm 106 of the lever arm contacts the tape head mounting unit 130 to move the unit 130 vertically along a double post chassis structure. The predetermined ratio of the lengths of the lever arm serve to create a mechanical advantage to precisely position the tape head mounting unit without requiring the need for a more expensive stepper motor.

The tape head mounting unit is biased upwardly against the force of the engagement arm 106 by a double coil torsional spring 190. The spring 190 engages the mounting unit 130 directly opposite and in the same vertical plane as the engagement arm 106. This minimizes torsional forces on the tape head mounting unit thereby reducing the azimuth error of the tape head as well as insuring a positive tracking of the tape head.

The tape head mounting unit is precisely aligned in the azimuth and zenith planes by resilient spring arms 150, 164, 166 molded onto the tape head mounting unit. These spring arms bias precisely molded contact areas of the mounting unit into engagement with the precisely molded areas on the chassis 20. These areas are molded to be in precise alignment with reference to tape cartridge alignment surfaces molded on the chassis. The tape head is thus precisely aligned with the tape without requiring additional azimuth adjustment.

A tape head is adhesively mounted in the tape head mounting unit against the reference surfaces of the tape head mounting unit that include the precisely molded alignment contact surfaces 132, 134.

The precision molding of the chassis, lead screw, tape head mounting unit and other components to a dimensional tolerance of ±0.0005 inches in the critical areas serves to increase the overall precision of the positioning system as well as eliminate the need for azimuth adjustment. The components are quickly assembled on the chassis without requiring extensive alignment and adjustment.

The design of the follower nut and lever arm engagement mechanism has reduced the torsional moments on the lever arm thereby increasing the positive precision tracking of the tape head. The design of the tape head mounting unit combined with the alignment of the forces acting on the unit reduces the torsional moments acting on the tape head which, in turn, reduces error in the tape head tracking.

These and other features provide a back-up tape drive that greatly increases the precision in positioning the tape head while reducing the production costs.

It is to be expressly understood that the claimed invention is not to be limited to the description of the preferred embodiment but encompasses other modifications and alterations within the scope and spirit of the inventive concept.

We claim:

1. A tape head fine positioning system for positioning a magnetic tape head in a back-up tape cartridge drive system, said system comprising:
    a chassis for mounting said back-up system;
    an elongated lever arm engaging said chassis, said elongated lever arm having a first end and a second end an a longitudinal axis passing from the first end to the second end;
    means attached to said chassis to move said first end of said lever arm in a vertical axis, wherein said vertical axis intersects and is substantially perpendicular to said longitudinal axis;
    means on the first end of said lever arm for engaging said lever arm moving means at a plurality of points wherein said plurality of points lie in a substantially horizontal plane that is perpendicular to and intersects the vertical axis and said plurality of points lie in a substantially vertical plane that includes the vertical axis and is substantially perpendicular to said longitudinal axis of said lever arm so as to balance the force distribution between said lever arm and said lever arm moving means and eliminate cantilevered loading in the system;
    said system further comprising a tape head mounting unit mounted on said chassis to move vertically;
    means on the second end of said lever arm for engaging said tape head mounting unit such that said tape head mounting unit is moved vertically as said first end of said lever arm is moved vertically; and
    a tape head mounted in said tape head mounting unit.

2. The system of claim 1 wherein said lever arm moving means includes:
    a lead screw;
    means to bi-directionally rotate said lead screw;
    said engaging means on said first end of said lever arm comprising a follower nut threadingly engaging said lead screw, said first end of said lever arm engaging said follower nut to constrain the rotational movement of said follower nut to force said follower nut and said first end of said lever arm to move vertically as said lead screw rotates.

3. The system of claim 2 wherein said lever arm further comprises a pivot point formed at a predetermined distance on said lever arm to pivotally engage means on said chassis such that as said first end of said lever arm is moved vertically, said second end of said lever arm is moved in the opposite vertical direction a distance dependent upon said predetermined distance.

4. The system of claim 2 wherein said chassis further comprises two posts precisely molded on said chassis to be aligned with tape cartridge guide areas on said chassis, said posts spaced apart from one another upon which said tape head mounting unit is mounted to slide vertically thereon.

5. The system of claim 2 wherein said engaging means on said second end engage the upper portion of said tape head mounting unit and said system further includes means to bias said tape head mounting unit against the aforesaid engaging means thereby reducing the positional tracking error of said tape head.

6. The system of claim 2 wherein said tape head mounting unit comprises surfaces formed in said tape head mounting unit precisely aligning said tape head within said tape head mounting unit as said tape head is mounted in said tape head mounting unit.

7. The system of claim 6 wherein said tape head mounting unit further comprises a resilient spring arm means to clamp said tape head against said alignment surfaces as said tape head is mounted in said tape head mounting unit.

8. The system of claim 2 wherein said lead screw is formed by molding a material having characteristics of lubricity and quietness and having a dimensional tolerance of plus or minus 0.0005 inches or less over the length of said lead screw.

9. The system of claim 8 wherein said lever arm is formed of a carbon filled high density plastic material with a high resistance to flexure.

10. The system of claim 9 wherein said lever arm includes a bump formed along the upper surface of the lever arm, said bump contacts a limit switch on said system to prevent said follower nut from over traveling on said lead screw.

11. The system of claim 9 wherein said system further comprises means for sensing the limits of travel of said moving means; and
    means for discontinuing the movement of said moving means in response to a signal from said sensing means.

12. The system of claim 1 wherein said tape head mounting unit comprises surfaces formed in said tape head mounting unit precisely aligning said tape head within said tape head mounting unit as said tape head is mounted in said tape head mounting unit.

13. The system of claim 12 wherein said tape head mounting unit further comprises a resilient spring arm means to clamp said tape head against said alignment surfaces as said tape head is mounted in said tape head mounting unit.

14. The system of claim 1 wherein said engaging means on said second end engage the upper portion of said tape head mounting unit and said system includes means to upwardly bias said tape head mounting unit against the aforesaid engaging means thereby reducing the positional error of said tape head.

15. The system of claim 1 wherein said tape head mounting unit comprises means to bias said tape head mounting unit in the azimuth and zenith planes on said chassis to align said tape head mounting unit and reduce azimuth error.

16. The system of claim 1 wherein said lever arm is formed of a carbon filled high density plastic material with a high resistance to flexure.

17. A tape head fine positioning system for positioning a magnetic tape head in a back-up tape cartridge drive system, said system comprising:
    a chassis for mounting said back-up system;
    an elongated lever arm engaging said chassis, said elongated lever arm having a first end and a second end an a longitudinal axis passing from the first end to the second end;

means attached to said chassis to move said first end of said lever arm in a vertical axis, wherein said vertical axis intersects and is substantially perpendicular to said longitudinal axis, wherein said lever arm moving means includes:
i) a lead screw;
ii) means to bi-directionally rotate said lead screw;
iii) means on the first end of said lever arm for engaging said lever arm moving means at a plurality of points wherein said plurality of points lie in a horizontal plane that is substantially perpendicular to and intersects both the vertical axis and the longitudinal axis, said engaging means on said first end of said lever arm comprising a follower nut threadingly engaging said lead screw, said first end of said lever arm engaging said follower nut to constrain the rotational movement of said follower nut to force said follower nut and said first end of said lever arm to more vertically as said lead screw rotates; elongated horizontal slots formed on two opposing parallel sides of said follower nut, each of said slots having one end open and the other end closed, and load bearing surfaces extending radially outwardly from the lower edge of each of said slots;

a U-shaped yoke formed on said first end of said lever arm having a guide pin formed on each arm of said yoke spaced from the outer end of each yoke arm and extending radially inwardly from said yoke arms, said pins formed approximately the same diameter as the width of said slots and extending radially inwardly a distance approximately the same as the depth of said slots;

said pins engage in said slots to guide said lever arm into engagement with said follower nut;

said pins when fully engaged in said slots lie in said horizontal and vertical planes;

a first surface formed on each of said yoke arms extending longitudinally inwardly and downwardly to said pin formed on each of said yoke arms; a second surface formed on each of said yoke arms extending longitudinally inwardly and upwardly from said pin formed on each of said yoke arms; each of said surfaces formed approximately the same width as said radially outwardly extending surfaces of said follower nut;

said lever arm surfaces interacting with said follower nut surfaces to balance said force distribution between said lever arm and said follower nut and eliminate said cantilevered loading;

a tape head mounting unit mounted on said chassis to move vertically;

means on the second end of said lever arm for engaging said tape head mounting unit such that said tape head mounting unit is moved vertically as said first end of said lever arm is moved vertically; and a tape head mounted in said tape head mounting unit.

18. The system of claim 17 wherein said lever arm further comprises a pivot point formed at a predetermined distance on said lever arm to pivotally engage means on said chassis such that as said first end of said lever arm is moved vertically, said second end of said lever arm is moved in the opposite vertical direction a distance dependent upon said predetermined distance.

19. The system of claim 18 wherein said chassis further comprises:

a substantially rectangular shaped structure formed near the front end of said chassis having two parallel side walls, a rear wall having a central notch extending upwardly from the bottom of said rear wall partially up said rear wall, and a front wall having a vertical slot formed through the center of said front wall and extending the full height of said front wall;

the inner side walls of said vertical slot form two precisely molded surfaces aligned with tape cartridge guide areas on said chassis for said tape head mounting unit to vertically slide therein; and said rear central notch forms said means on said chassis for said lever arm to pivotally engage.

20. The system of claim 19 wherein said engaging means on said second end engage the upper portion of said tape head mounting unit and said system further includes means to bias said tape head mounting unit against the aforesaid engaging means thereby reducing the positional tracking error of said tape head.

21. The system of claim 20 wherein said biasing means comprise a double coil torsional spring having two free ends and a center portion, said two free ends are mounted on said chassis to be in a second vertical plane which contains said vertical slot and said center portion engages a lower portion of said tape head mounting unit in said second vertical plane and said engaging means on said second end engage said upper portion of said tape head mounting unit in said second vertical plane so the vertical components of the forces acting on said tape head mounting unit lie within said second vertical plane.

22. The system of claim 21 wherein said tape head mounting unit comprises surfaces formed in said tape head mounting unit precisely aligning said tape head within said tape head mounting unit as said tape head is mounted in said tape head mounting unit.

23. The system of claim 22 wherein said tape head mounting unit further comprises a resilient spring arm means to clamp said tape head against said alignment surfaces as said tape head is mounted in said tape head mounting unit.

24. The system of claim 20 wherein said tape head mounting unit comprises means to bias said tape heading mounting unit in the azimuth plane on said chassis to align said tape head mounting unit and reduce azimuth error and means to bias said tape head mounting unit in the zenith plane on said chassis.

25. The system of claim 24 wherein said azimuth biasing means include a resilient arm biasing said tape head mounting unit against said precisely molded surfaces formed on said sides of said slot; and said zenith biasing means comprise two resilient clips formed on opposite sides of the rear of said tape head mounting unit to bias control surfaces formed on said tape head mounting unit against precisely molded surfaces formed on said front wall.

26. A tape head fine positioning system for positioning a magnetic tape head in a back-up cartridge drive system, said system comprising:

a chassis for mounting said back-up system;

a tape head mounting unit mounted on said chassis to move vertically, said tape head mounting unit having an upper portion and having a plurality of contact surfaces for engaging the chassis, wherein the contact surfaces are located in a first vertical plane;

an elongated lever arm having a first end and a second end, said elongated lever arm engaging said chassis and having a longitudinal axis passing from the first end to the second end, the lever arm being positioned so that the longitudinal axis is perpendicular to the first vertical plane;

means attached to said chassis to move the first end of said lever arm in a vertical axis;

means on a second end of said lever arm for engaging said tape head mounting unit to move said tape head mounting unit as said first end of said lever arm is moved in said vertical axis, wherein the means for engaging contacts the upper portion of said tape head mounting unit substantially in the first vertical plane;

means on said tape head mounting unit to align said tape head mounting unit to said chassis thereby minimizing positional error;

a tape head mounted in said tape head mounting unit; and means on said system to reduce the torsional forces on said tape head mounting unit.

27. The system of claim 26 wherein said means on said lever arm for engaging said tape head mounting unit engages an upper portion on said tape head mounting unit; and said system further comprises means to upwardly bias said tape head mounting unit against said lever arm second end engaging means thereby decreasing the positional tracking error.

28. The system of claim 26 wherein said tape head mounting unit is slidably mounted on a double post structure precisely molded on said chassis aligned with tape cartridge reference surfaces formed on said chassis.

29. The system of claim 26 wherein said tape head mounting unit further comprises reference surfaces formed in said tape head mounting unit for precisely aligning said tape head unit within said tape head mounting unit, and a resilient spring arm means to clamp said tape head against said references surfaces as said tape head is mounted in said tape head mounting unit.

30. The system of claim 26 wherein said means for moving said first end of said lever arm attaches to said lever arm at a plurality of points located in a second substantially vertical plane including the vertical axis, wherein said second substantially vertical plane is substantially perpendicular to said longitudinal axis of said lever arm thereby balancing force distribution between said lever arm and said lever arm moving means.

31. The system of claim 30 wherein said means to move said first end of said lever arm includes: a lead screw wherein an axis of rotation f the lead screw is the vertical axis, means to bi-directionally rotate said lead screw, a follower nut threadingly engaging said lead screw and means mounting said first end of said lever arm to said follower nut to constrain rotational movement of said follower nut thus forcing said follower nut and said lever arm to move in the vertical axis as said lead screw rotates.

32. A tape head fine positioning system for positioning a magnetic tape head in a back-up tape cartridge drive system, said system comprising:

a chassis for mounting said back-up system;

a tape head mounting unit mounted on said chassis to move vertically, said tape head mounting unit having an upper portion;

an elongated lever arm having a first end and a second end, said elongated lever arm engaging said chassis and having a longitudinal axis passing from the first end to the second end;

means attached to said chassis to move the first end of said lever arm in a vertical axis;

means on a second end of said lever arm for engaging said tape head mounting unit to move said tape head mounting unit as said first end of said lever arm is moved in said vertical axis, wherein the means for engaging contacts the upper portion of said tape head mounting unit;

means on said tape head mounting unit to align said tape head mounting unit to said chassis thereby minimizing positional error;

a tape head mounted in said tape head mounting unit, means on said system to reduce the torsional forces on said tape head mounting unit; wherein said means to reduce torsional forces includes:

a double coil torsional spring having two free ends and a center portion, wherein said center portion engages said tape head mounting unit in a first vertical plane containing said engaging means on said second end of said lever arm to upwardly bias said tape head mounting unit against said lever arm second end engaging means thereby decreasing the positional tracking error; and said two free ends engage said chassis in said first vertical plane so the forces acting on said tape head mounting unit substantially lie within said first vertical plane.

33. The system of claim 32 wherein said means to reduce the torsional forces on said tape head mounting unit include a double post structure that said tape head mounting unit vertically moves on, said double post structure is molded on said chassis (i) to be precisely aligned with said tape cartridge reference surfaces formed on said chassis and (ii) to lie in said first vertical plane so the forces acting on said tape head mounting unit are aligned in said first vertical plane thereby reducing extraneous moments on said tape head mounting unit.

34. The system of claim 33 wherein said chassis comprises a substantially rectangular shaped structure formed near the front end of said chassis, said structure having two parallel side walls, a rear wall and a front wall having a vertical slot formed through the center of said front wall and extending the full height of said front wall, said slot having side walls forming said double post structure for said head mounting unit to vertically move thereon.

35. The system of claim 34 wherein said system further comprises zenith control surfaces formed on said front wall and azimuth control surfaces formed on said side walls of said slot;

said tape head mounting unit comprise means to bias said tape head mounting unit against said zenith control surfaces and means to bias said tape head mounting unit against said azimuth control surfaces so as to align said tape head mounting unit on said chassis; and said first vertical plane further includes said side walls of said slot.

36. The system of claim 35 wherein said zenith control surfaces and said azimuth control surfaces are formed by precision molding of said chassis to dimensional tolerances of plus or minus 0.0005 inch or less.

37. The system of claim 35 wherein said zenith biasing means comprise two resilient arms biasing said tape head mounting unit against said zenith control surface; and said azimuth biasing means comprise a resilient arm biasing said tape head mounting unit against said azimuth control surface.

38. The system of claim 37 wherein said tape head mounting unit comprises reference surfaces formed in said tape head mounting unit precisely aligning said tape head within said tape head mounting unit when said tape head is mounted in said tape head mounting unit.

39. The system of claim 38 wherein said tape head mounting unit further comprises a resilient spring arm means to clamp said tape head against said reference surfaces as said tape head is mounted in said tape head mounting unit.

40. A tape head fine positioning system for positioning a magnetic tape head in a back-up tape cartridge drive system, said system comprising:

a chassis for mounting said back-up system;
a tape head mounting unit mounted on said chassis to move vertically;
an elongated lever arm engaging said chassis and having a first end, a second end, and a longitudinal axis passing through the first end and the second end;
means attached to said chassis for moving the first end of said lever arm in a vertical axis;
means on the second end of said lever arm for engaging said tape head mounting unit to move said tape head mounting unit as said first end of said lever arm is moved in said vertical axis;
means on said tape head mounting unit to align said tape head mounting unit to said chassis thereby minimizing positional error;
a tape head mounted in said tape head mounting unit; and
said means for moving said first end of said lever arm includes means for mounting said first end of said lever arm to said means for moving, said means for mounting located in a substantially horizontal plane including the longitudinal axis and in a substantially vertical plane including the vertical axis, said substantially vertical plane being substantially perpendicular to said longitudinal axis of said lever arm so as to balance the force distribution between said lever arm and said lever arm moving means and eliminate cantilevered loading in the system.

41. The system of claim 40 wherein said means to move said first end of said lever arm includes: a lead screw, means to bi-directionally rotate said lead screw, a follower nut threadingly engaging said lead screw, and said means for mounting said first end of said lever arm to said follower nut further comprises means to constrain rotational movement of said follower nut thus forcing said follower nut and said lever arm to move vertically as said lead screw rotates.

42. A tape head fine positioning system for positioning a magnetic tape head in a back-up tape cartridge drive system, said system comprising:

a chassis for mounting said back-up system;
a tape head mounting unit mounted on said chassis to move vertically;
an elongated lever arm engaging said chassis and having a first end, a second end, and a longitudinal axis passing through the first end and the second end;
means attached to said chassis for moving the first end of said lever arm in a vertical axis;
means on the second end of said lever arm for engaging said tape head mounting unit to move said tape head mounting unit as said first end of said lever arm is moved in said vertical axis;
means on said tape head mounting unit to align said tape head mounting unit to said chassis thereby minimizing positional error;
a tape head mounted in said tape head mounting unit;
wherein said means for moving said first end of said lever arm includes a lead screw, means to bi-directionally rotate said lead screw, a follower nut threadingly engaging said lead screw and means for mounting said first end of said lever arm to said means for moving,
wherein said mounting means are located in a substantially horizontal plane including the longitudinal axis and in a vertical plane including the vertical axis and said means for mounting further comprise means to constrain rotational movement of said follower nut thus forcing said follower nut and said lever arm to move vertically as said lead screw rotates;
elongated horizontal slots formed on two opposing parallel sides of said follower nut, each of said slots having one end open and the other end closed, and a load bearing surface extending radially outwardly from the lower edge of each of said slots;
a U-shaped yoke formed on said first end of said lever arm having guide pins formed on each of the arms of said yoke arm spaced from the outer end of each of said yoke arms and extending radially inwardly from said yoke arms, said pins formed approximately the same diameter as the width of said slots and extending radially inwardly a distance approximately the same as the depth of said slots, said pins engage in said slots to guide said lever arm into engagement with said follower nut;
a first surface formed on each of said yoke arms extending longitudinally inwardly and downwardly to said pin formed on each of said yoke arms; a second surface formed on each of said yoke arms extending longitudinally inwardly and upwardly from said pin formed on each of said yoke arms; each of said surfaces formed approximately the same width as said outwardly extending load bearing surfaces of said follower nut, whereby said lever arm surfaces interact with said follower nut surfaces to balance force distribution between said lever arm and said follower nut and eliminate cantilever loading on said system.

43. The system of claim 42 wherein said lever arm further comprises a pivot point formed at a predetermined distance on said lever arm to pivotally engage means on said chassis such that as said first end of said lever arm is moved vertically, said second end of said lever arm is moved in the opposite vertical direction a distance dependent upon said predetermined distance.

44. The system of claim 43 wherein said lever arm is formed of a carbon filled high density plastic material with a high resistance to flexure.

45. The system of claim 44 wherein said lever arm includes a bump formed along an upper surface of said lever arm, said bump contacts a limit switch on said system to prevent said follower nut from over traveling on said lead screw.

46. The system of claim 44 wherein said system further comprises means for sensing the limits of travel of said moving means; and
   means for discontinuing the movement of said moving means in response to a signal from said sensing means.

47. A tape head fine positioning system for positioning a magnetic tape head in a back-up tape cartridge drive system, said system comprising:
   a chassis for mounting said back-up system, said chassis having precisely molded reference surfaces to eliminate the need for azimuth adjustment; said reference surfaces having a precise dimensional tolerance of plus or minus 0.0005 inches or less,
   a tape head mounting unit mounted on said chassis to move vertically;
   a tape head mounted in said tape head mounting unit;
   a lever arm engaging said chassis;
   means engaging a first end of said lever arm to move said first end of said lever arm vertically;
   means on the second end of said lever arm to move said tape head mounting unit vertically on said chassis as said first end of said lever arm moves, wherein said chassis includes a substantially rectangular shaped structure formed near the front end of said chassis having two parallel side walls, a rear wall and a front wall, said front wall having a vertical slot formed in the center of said front wall extending the full height of said front wall, said vertical slot includes inner side walls forming guides for said tape mounting head unit to move vertically on;
   said reference surfaces include said sides of said slot precisely aligned with tape cartridge alignment surfaces formed on said chassis to align said tape head mounted in said tape head mounting unit with a tape cartridge aligned by said tape cartridge alignment surfaces.

48. The system of claim 47 wherein said sides of said slot include a step formed midway down each side having a dimensional tolerance greater than 0.0005 inches; and
   alignment surfaces formed on said tape head mounting unit comprise an upper and a lower alignment surface on each exterior side of said tape head mounting unit so that said steps are not contacted by said tape head mounting unit alignment surfaces.

49. The system of claim 48 wherein said tape head mounting unit includes a resilient arm biasing said alignment surfaces formed on the sides of said tape head mounting unit against said reference surfaces formed on said sides of said slot.

50. The system of claim 49 wherein said reference surfaces further include alignment surfaces formed on said front wall of said structure; and
   said tape head mounting unit further comprises two resilient arms formed on opposite sides of the rear of said tape head mounting unit to bias second alignment surfaces formed on the exterior sides of said tape head mounting unit against said front wall alignment surfaces of said structure to align said tape head mounting unit in a vertical plane.

51. The system of claim 50 wherein said second end of said lever arm engages said tape head mounting unit in said vertical plane and said tape head mounting unit is upwardly biased against said second end of said lever arm by biasing means engaging said tape head mounting unit in said vertical plane such that the forces acting upon said tape head mounting unit are aligned in said vertical plane thereby reducing the torsional forces acting on said tape head mounting unit.

52. The system of claim 51 wherein said basing means comprise a double coil torsional spring having two free ends and a center portion;
   said center portion engages said tape head mounting unit in said vertical plane containing said engaging means on said second end to bias said tape head mounting unit against the aforesaid engaging means; and
   said two free ends engage said chassis in said vertical plane so the forces acting on said tape head mounting unit lie substantially within said first vertical plane thereby reducing the torsional forces acting on said tape head mounting unit.

53. The system of claim 52 wherein said tape head mounting unit comprises a precisely molded inner upper wall surface and a precisely molded inner side wall surface to align said tape head in said tape head mounting unit as said tape head s mounted into said tape head mounting unit.

54. The system of claim 53 wherein said tape head mounting unit further comprises a resilient spring arm means to clamp said tape head against said tape head mounting unit inner alignment surfaces as said tape head is mounted in said tape head mounting unit.

55. The system of claim 54 wherein said means for moving said first end of said lever arm includes means for receiving said first end of said lever arm, said means for receiving located in a substantially vertical plane including the vertical axis and in a substantially horizontal plane including the longitudinal axis.

56. The system of claim 47 wherein said means to move said first end of said lever arm includes: a lead screw, wherein the vertical axis is the axis of rotation of the lead screw, means to bi-directionally rotate said lead screw, a follower nut threadingly engaging said lead screw and means located at the first end of said lever arm for mounting said first end of said lever arm to said follower nut to constrain rotational movement of said follower nut thus forcing said follower nut and said lever arm to move vertically as said lead screw rotates; and
   said mounting means are oriented in (i) a substantially horizontal plane including the longitudinal axis or said lever arm as well as in (ii) a vertical plane including the axis of rotation of said lead screw and perpendicular to said longitudinal axis of said lever arm.

57. The system of claim 56 wherein said mounting means comprise
   elongated horizontal slots formed on two opposing parallel dies of said follower nut, each of said slots having one end open and the other end closed, and a load bearing surface extending radially outwardly from the lower edge of each of said slots;
   a U-shaped yoke formed on said first end of said lever arm having guide pins formed on each of the arms of said yoke arm spaced from the outer end of each of said yoke arms and extending radially inwardly from said yoke arms, said pins formed approximately the same diameter as the width of said slots and extending radially inwardly a distance approximately the same as the depth of said slots, said pins engage in said slots to guide said lever arm into engagement with said follower nut;

a first surface formed on each of said yoke arms extending longitudinally inwardly and downwardly to said pin formed on each of said yoke arms; a second surface formed on each of said yoke arms extending longitudinally inwardly and upwardly from said pin formed on each of said yoke arms; each of said surfaces formed approximately the same width as said outwardly extending load bearing surfaces of said follower nut.

58. The system of claim 57 wherein said lever arm further comprises a pivot point formed at a predetermined distance on said lever arm to pivotally engage said chassis such that as said first end of said lever arm is moved vertically, said second end of said lever arm is moved in the opposite vertical direction a distance dependent upon said predetermined distance.

59. The system of claim 58 wherein said lever arm is formed of a carbon filled high density plastic material with a high resistance to flexure.

60. The system of claim 59 wherein said lever arm includes a bump formed along the upper surface of said lever arm, said bump contacts a limit switch on said system to prevent said follower nut from over traveling on said lead screw.

61. The system of claim 60 wherein said lead screw is formed by precision molding within plus or minus 0.0005 inch over the length of said lead screw.

62. The system of claim 59 wherein said system further comprises means for sensing the limits of travel of said moving means; and means for discontinuing the movement of said moving means in response to a signal from said sensing means.

63. A tape head fine positioning system for positioning a magnetic tape head in a back-up tape cartridge drive back-up system, said system comprising:

a chassis for mounting said back-up system, said chassis including precisely molded reference surfaces;

a tape head mounting unit slidably mounted against said reference surfaces on said chassis to move vertically;

means on said tape head mounting unit to align said tape head mounting unit to said chassis to eliminate the need for azimuth adjustment of said tape head mounting unit in said chassis;

means on said system to reduce the torsional forces on said tape head mounting unit;

a tape head mounted in said tape head mounting unit;

an elongated lever arm engaging said chassis, said elongated lever arm including a first end, a second end engaging said tape head mounting means, and a longitudinal axis passing through the first end and the second end;

means attached to said chassis for moving said first end of said lever arm in a vertical axis; and means on said first end of said lever arm for mounting said means for moving to said lever arm, said means for mounting located in a substantially horizontal plane including the longitudinal axis and in a substantially vertical plane including the vertical axis and substantially perpendicular to said longitudinal axis of said lever arm so as to balance about said vertical axis force applied by said lever arm to said means for moving and eliminate cantilevered loading in the system.

64. The system of claim 63 wherein said means to move said lever arm includes: a lead screw, means to bi-directionally rotate said lead screw, a follower nut threadingly engaging said lead screw, and said means for mounting said first end of said lever arm to said means for moving attaches to said follower nut so as to constrain rotational movement of said follower nut thus forcing said follower nut and said lever arm to move vertically as said lead screw rotates.

65. The system of claim 64 wherein said lead screw is formed from precision molded plastic to a dimensional tolerance of plus or minus five/ten thousandths of an inch or less over the length of said lead screw.

66. The system of claim 64 further comprising:

elongated horizontal slots formed on two opposing parallel sides of said follower nut, each of said slots having one end open and the other end closed, and a load bearing surface extending radially outwardly from the lower edge of each of said slots;

said means for mounting further comprise:

a U-shaped yoke formed on said first end of said lever arm having guide pins formed on each of the arms of said yoke arm spaced from the outer end of each of said yoke arms and extending radially inwardly from said yoke arms, said pins formed approximately the same diameter as the width of said slots and extending radially inwardly a distance approximately the same as the depth of said slots, said pins engage in said slots to guide said lever arm into engagement with said follower nut;

a first surface formed on each of said yoke arms extending longitudinally inwardly and downwardly to said pin formed on each of said yoke arms; a second surface formed on each of said yoke arms extending longitudinally inwardly and upwardly from said pin formed on each of said yoke arms; each of said surfaces formed approximately the same width as said outwardly extending load bearing surfaces of said follower nut, said lever arm surfaces interacting with said follower nut surfaces.

67. The system of claim 66 wherein said lever arm further comprises a pivot point formed at a predetermined distance on said lever arm to pivotally engage means on said chassis such that as said first end of said lever arm is moved vertically, said second end of said lever arm is moved in the opposite vertical direction a distance dependent upon said predetermined distance.

68. The system of claim 63 wherein said chassis includes a substantially rectangular shaped structure formed near the front end of said chassis having two parallel side walls, a rear wall and a front wall, said front wall having a vertical slot formed in the center of said front wall extending the full height of said front wall, said vertical slot including inner side walls forming guides for said tape mounting head unit to slide vertically on;

said reference surfaces include said sides of said slot precisely aligned with tape cartridge alignment surfaces formed on said chassis to align said tape head mounted in said tape head mounting unit with a tape cartridge aligned by said tape cartridge alignment surfaces.

69. The system of claim 68 wherein each of said sides of said slot include a step formed midway down each side; and an upper and a lower alignment surface on each exterior side of said tape head mounting unit wherein said upper and lower alignment surfaces are separated by one said step so that said step is not contacted by said tape head mounting unit alignment surfaces.

70. The system of claim 69 wherein said tape head mounting unit includes a resilient arm biasing said alignment surfaces formed on the sides of said tape head mounting unit against said reference surfaces formed on said sides of said slot.

71. The system of claim 70 wherein said reference surfaces further include alignment surfaces formed on said front wall of said structure; and said tape head mounting unit further comprises two resilient arms formed on opposite sides of the rear of said tape head mounting unit to bias second alignment surfaces formed on the exterior sides of said tape head mounting unit against said front wall alignment surfaces of said structure to align said tape head mounting unit in a vertical plane.

72. The system of claim 71 wherein said second end of said lever arm engages said tape head mounting unit in said vertical plane and said tape head mounting unit is upwardly biased against said second end of said lever arm by biasing means engaging said tape head mounting unit in said vertical plane so the forces acting upon said tape head mounting unit lie in said vertical plane thereby reducing the torsional forces acting on said tape head mounting unit.

73. The system of claim 72 wherein said biasing means comprise a double coil torsional spring having two free ends and a center portion;

said center portion engages said tape head mounting unit in said vertical plane containing said lever arm second engaging means to bias said tape head mounting unit against said lever arm second engaging means; and said two free ends engaging said chassis in said vertical plane so all forces acting on said tape head mounting unit are substantially contained within said first vertical plane to reduce the torsional forces acting on said tape head mounting unit.

74. The system of claim 73 wherein said tape head mounting unit comprises a precisely molded inner upper wall surface and a precisely molded inner side wall surface to align said tape head in said tape head mounting unit as said tape head is mounted into said tape head mounting unit.

75. The system of claim 74 wherein said tape head mounting unit further comprises a resilient spring arm means to clamp said tape head against said inner alignment surfaces as said tape head is mounted in said tape head mounting unit.

76. The system of claim 63 wherein said tape head mounting unit comprises a precisely molded inner upper wall surface and a precisely molded inner side wall surface to align said tape head in said tape head mounting unit as said tape head is mounted in said tape head mounting unit.

77. The system of claim 76 wherein said tape head mounting unit further comprises a resilient spring arm means to clamp said tape head against said inner alignment surfaces as said tape head is mounted in said tape head mounting unit.

78. The system of claim 63 wherein said second end of said lever arm engages said tape head mounting unit in a vertical plane and said tape head mounting unit is upwardly biased against said second end of said lever arm by biasing means engaging said tape head mounting unit in said vertical plane so the forces acting upon said tape head mounting unit are aligned in said vertical plane thereby reducing the torsional forces acting on said tape head mounting unit.

79. The system of claim 78 wherein said biasing means comprise a double coil torsional spring having two free ends and a center portion;

said center portion engages said tape head mounting unit in said vertical plane to bias said tape head mounting unit against said lever arm second engaging means; and said two free ends engage said chassis in said vertical plane so the forces from said lever arm and said spring acting on said tape head mounting unit lie substantially within said vertical plane thereby reducing the torsional forces acting on said tape head mounting unit.

80. The system of claim 63 wherein said lever arm is formed of a carbon filled high density plastic material with a high resistance to flexure.

81. The system of claim 80 wherein said lever arm includes a bump formed along the upper surface of said lever arm, said bump contacts a limit switch on said system to prevent said follower nut from over traveling on said moving means.

82. The system of claim 80 wherein said system further comprises means for sensing the limits of travel of said moving means; and means for discontinuing the movement of said moving means in response to a signal from said sensing means.

* * * * *